(12) United States Patent
Mishima et al.

(10) Patent No.: US 7,940,634 B2
(45) Date of Patent: May 10, 2011

(54) MULTILAYER OPTICAL RECORDING MEDIUM AND RECORDING METHOD ON MULTILAYER OPTICAL RECORDING MEDIUM

(75) Inventors: Koji Mishima, Tokyo (JP); Takashi Kikukawa, Tokyo (JP); Hidetake Itoh, Tokyo (JP)

(73) Assignee: TDK Corporation, Tokyo (JP)

( * ) Notice: Subject to any disclaimer, the term of this patent is extended or adjusted under 35 U.S.C. 154(b) by 648 days.

(21) Appl. No.: 11/898,427

(22) Filed: Sep. 12, 2007

(65) Prior Publication Data

US 2008/0068967 A1   Mar. 20, 2008

(30) Foreign Application Priority Data

Sep. 15, 2006   (JP) ................................. 2006-250480
Jul. 19, 2007   (JP) ................................. 2007-188382

(51) Int. Cl.
*G11B 7/00* (2006.01)
(52) U.S. Cl. ............... 369/275.3; 369/275.2; 369/59.11; 369/47.52; 369/94
(58) Field of Classification Search .................. None
See application file for complete search history.

(56) References Cited

U.S. PATENT DOCUMENTS

| | | | | |
|---|---|---|---|---|
| 5,907,534 A * | 5/1999 | Yamatsu | ...................... | 369/286 |
| 6,153,355 A * | 11/2000 | Takahashi et al. | ....... | 430/270.13 |
| 6,656,559 B2 * | 12/2003 | Mizushima et al. | ......... | 428/64.1 |
| 6,724,716 B2 * | 4/2004 | Yamaguchi et al. | ....... | 369/275.2 |
| 6,738,335 B1 * | 5/2004 | Todori et al. | ..................... | 369/94 |
| 7,060,338 B2 * | 6/2006 | Ikari et al. | ..................... | 428/64.1 |
| 7,193,948 B2 * | 3/2007 | Furukawa et al. | ......... | 369/59.11 |
| 7,221,644 B2 * | 5/2007 | Kobayashi et al. | ........ | 369/275.5 |
| 7,336,575 B2 * | 2/2008 | Banno | ........................ | 369/47.53 |
| 7,668,070 B2 * | 2/2010 | Ohkubo | ..................... | 369/275.1 |
| 2004/0264357 A1 * | 12/2004 | Ikari et al. | .................. | 369/275.2 |
| 2005/0074694 A1 * | 4/2005 | Nishihara et al. | ........ | 430/270.13 |
| 2007/0002699 A1 * | 1/2007 | Suh | ........................... | 369/30.07 |

FOREIGN PATENT DOCUMENTS

| | | |
|---|---|---|
| JP | A-09-198709 | 7/1997 |
| JP | A 2004-213720 | 7/2004 |
| JP | A 2005-104110 | 4/2005 |

* cited by examiner

*Primary Examiner* — Van N Chow
(74) *Attorney, Agent, or Firm* — Oliff & Berridge, PLC

(57) ABSTRACT

In a multilayer optical recording medium having three or more recording layers, when data is recorded on a recording layer far away from an incident surface of laser light, and especially on a recording layer farthest away from the incident surface of the laser light, by applying the laser light, the recording power margin of the farthest recording layer allows for a variation in the optimal recording sensitivity even if the transmittance of the recording layers located between the laser light incident surface side and the target recording layer is varied due to existing recordings and the amount of the laser light passing therethrough is also varied. In this case, the recording layer which is the farthest from an incident surface of laser light has a phase change recording film, and the recording layer which is the nearest from the incident surface of the laser light has a write-once read-multiple recording film.

5 Claims, 5 Drawing Sheets

MULTILAYER OPTICAL RECORDING MEDIUM AND RECORDING METHOD ON MULTILAYER OPTICAL RECORDING MEDIUM

BACKGROUND OF THE INVENTION

1. Field of the Invention

The present invention relates to a multilayer optical recording medium having three or more recording layers and a method for recording information on the multilayer optical recording medium.

2. Description of the Related Art

Optical recording media such as CDs (Compact Discs) and DVDs (Digital Versatile Discs) are widely utilized as information recording media. Furthermore, some types of optical recording media which utilize a blue or blue-violet laser as the irradiation light to store more information than ever receives attention in recent years.

The optical recording media are generally classified into three types: a ROM (Read Only Memory) type, which can neither record nor rewrite data, a RW (Rewritable) type, which can rewrite data, and an R (Recordable) type, which can record data only once.

In the R-type and RW-type optical recording media, a recording layer is irradiated with laser light and a recording mark which has a reflectivity different from that of surrounding spaces is formed, thereby allowing for the recording of data. Generally in the optical recording medium, the recording layer is irradiated with laser light and a photodetector then measures the difference in reflectance between the recording mark and the space section to reproduce data.

Such optical recording media can have an increased storage capacity if a plurality of recording layers is utilized. For example, in R-type or RW-type optical recording media that have a plurality of recording layers, data can be selectively recorded on a target recording layer when a recording laser beam is focused onto that target recording layer. The data can therefore be selectively reproduced from that target recording layer alone when the reproducing laser beam is focused onto that target recording layer. Furthermore, in a multilayer recording medium having three or more recording layers, it is preferable that the extinction coefficient of each recording layer except for the $L_0$ layer, through which laser light does not need to pass because the $L_0$ layer is the layer farthest away from the recording layer, be 0.5 or less for the wavelength of the laser light used with regard to both transmittance and recording sensitivity.

As described above, in a multilayer optical recording medium, the focus of the laser light is adjusted onto the target recording layer when recording and reproducing data. In such cases, the laser light passes through the recording layers lying on the side of the incident surface of the laser light and onto the target recording layer. It is preferable that transmittance should be constant irrespective of the recording conditions of the recording layers lying between the incident surface and the target recording layer.

In actual fact, however, when data is stored on the recording layer on the incident surface side of the target recording layer, the recording mark area formed varies in both reflectivity, as described above, and transmittance. The inventors discovered that since the amount of laser light passing through a recording mark area of varying transmittance was different from the amount of laser light passing through an area other than the recording mark area, the amount of laser light (being the amount of transmittance) reaching the target recording layer varied and hence the optimal recording sensitivity of the target recording layer also varied. This problem is especially noticeable in a multilayer optical recording medium having three or more recording layers.

SUMMARY OF THE INVENTION

In view of the foregoing problems, various exemplary embodiments of this invention provide a multilayer optical recording medium having three or more recording layers and to provide a method for recording information on the multilayer optical recording medium in which, when data is recorded on a recording layer far away from an incident surface of laser light, and especially on a recording layer farthest away from the incident surface of the laser light, by applying the laser light, the recording power margin of the farthest recording layer allows for a variation in the optimal recording sensitivity even if the transmittance of the recording layers located between the laser light incident surface side and the target recording layer is varied due to existing recordings and the amount of the laser light passing therethrough is also varied.

As a result of thorough investigations, the inventors have found that, in a multilayer optical recording medium having three or more recording layers, the number of recording layers through which light needs to pass through is not proportional to the ratio of variation in the transmittance of laser light before and after recording on the recording layer through which light needs to pass. Specifically, when the number of recording layers of a multilayer optical recording medium increases from 2 to 3 or to 5, the number of recording layers through which light needs to pass increases from 1 to 2 or 4, but the ratio of variation in transmittance before and after recording becomes greater than two or four times.

The inventors have therefore manufactured a multilayer optical recording medium having five recording layers in total using Si/Cu as the recording film material for the $L_0$ layer and Bi—Ge—O as the recording film material for the $L_1$ to $L_4$ layers. The $L_0$ layer has a phase change recording film and the $L_1$ to $L_4$ layers have a write-once read-multiple recording film.

A description of how to calculate the ratio of variation in the transmittance of each recording layer will now be described.

Pwa represents the optimal recording power at which jitter occurring during reproduction is minimized when information is recorded on a target recording layer where data has been recorded on all recording layers located between the laser light incident surface side and the target recording layer (the recording layer on which an attempt is made to record and reproduce data) of the multilayer optical recording medium, and Ta represents the rate of an amount of light passing through from the incident surface of the laser light to just before the target recording layer. Pwb represents the optimal recording power at which jitter occurring during reproduction is minimized when information is recorded on the target recording layer where data has not been recorded on any recording layer located between the laser light incident surface side and the target recording layer, and Tb represents the rate of an amount of light passing through from the incident surface of the laser light to just before the target recording layer.

Tb/Ta represents the ratio of variation in cumulative transmittance between the case where information has been recorded on all recording layers located between the laser light incident surface side and the target recording layer and the case where information has not been recorded at all.

In the case where information has not been recorded on any recording layer which is not adjacent to a target recording layer on the laser light incident surface side, when information is recorded on a recording layer adjacent to the target recording layer on the laser light incident surface side, Ta' represents the rate of an amount of light passing through the recording layer. When information is not recorded on the recording layer adjacent to the target recording layer on the laser light incident surface side, Tb' represents the rate of an amount of light passing through the recording layer. Tb'/Ta' represents the ratio of variation in transmittance of only the recording layer adjacent to the target recording layer in the case where information is recorded on the recording layer adjacent to the target recording layer on the laser light incident surface side and in the case where information is not recorded on the recording layer adjacent to the target recording layer on the laser light incident surface side.

The different in optimal recording power between Pwa and Pwb is caused by a difference in the amount of light reaching the target recording layer. When Pw represents the optimal recording power in the case where the transmittance of light reaching the target recording layer is set at 100%, Tb/Ta can be calculated by the following equation.

$$Pw=Pwa*Ta, Pw=Pwb*Tb$$

$$Tb/Ta=Pwa/Pwb$$

It should also be noted that when $Ta_0$, $Tb_0$, $Pwa_0$, and $Pwb_0$ represent Ta, Tb, Pwa, and Pwb in an $L_0$ layer, respectively, $Tb_0/Ta_0=Pwa_0/Pwb_0$ holds. Furthermore, the ratio of $Tb_1/Ta_1$ in an $L_1$ layer is similarly $Tb_1/T_1=Pwa_1/Pwb_1$. In a medium having five layers of recording films, the same holds true for $Ta_2$ to $Ta_4$ and $Tb_2$ to $Tb_4$. However, $Ta_4$, $Tb_4$, $Ta_4'$, and $Tb_4'$ become 1 (i.e., a transmittance of 100%) as there is no other recording layer on the light incident surface side upper than an $L_4$ layer.

Since $Ta_0$ and $Tb_0$ represent the rate of an amount of light passing through from the incident surface of the laser light to just before the $L_0$ layer, the following equations hold when there are five recording layers. In this instance, $Ta_0'$ to $Ta_4'$ represent Ta' at the $L_0$ to $L_4$ layers, respectively, and similarly $Tb_0'$ to $Tb_4'$ represent Tb'. Therefore:

$$Ta_0=Ta_0'*Ta_1' \ldots *Ta_4'$$

$$Tb_0=Tb_0'*Tb_1' \ldots *Tb_4'$$

This also holds for $Ta_1$ and $Tb_1$, $$Ta_1=Ta_1'*Ta_2' \ldots *Ta_4'$$

$$Tb_1=Tb_1'*Tb_2' \ldots *Tb_4'$$

$Ta_2$ to $Ta_4$ and $Tb_2$ to $Tb_4$ can be similarly expressed. Expanding these expressions gives:

$$Tb_0'/Ta_0'=(Tb_0/Ta_0)/(Tb_1/Ta_1)$$

wherein $Tb_0/Ta_0$ and $Tb_1/Ta_1$ are equal to $Pwa_0/Pwb_0$ and $Pwa_1/Pwb_1$, respectively, and therefore it is possible to derive $Tb_0'/Ta_0'$ from each optimal recording power.

Accordingly, Tb'/Ta' for all the recording layers except for the $L_0$ layer can be similarly calculated. Since Tb'/Ta'=Pwa/Pwb is able to be used as described above, it is possible to easily calculate the ratio of variation in the transmittance of each recording layer by measuring the optimal recording power.

By calculating the ratio of variation in transmittance like this, it became apparent that the transmittance of the $L_0$ layer did not vary significantly when data had been recorded on the $L_2$ to $L_4$ layers. When data had been recorded on the $L_1$ to $L_4$ layers, however, the transmittance of the $L_0$ layer varied significantly. Table 1 shows Pwa, Pwb, Tb/Ta, and Tb'/Ta' for each recording layer. Since the $L_4$ layer is located at the position nearest to the incident surface of the laser light and the laser light which has passed through another layer is not applied thereto, Pwa is equal to Pwb and hence Tb/Ta and Tb'/Ta' are "1.00."

TABLE 1

| Recording layer | Recording material | Pwa (mW) | Pwb (mW) | Tb/Ta | Tb'/Ta' |
|---|---|---|---|---|---|
| $L_4$ | Bi—Ge—O | 9 | 9 | 1.00 | 1.00 |
| $L_3$ | Bi—Ge—O | 9.4 | 9.5 | 0.99 | 0.99 |
| $L_2$ | Bi—Ge—O | 8.8 | 9.1 | 0.97 | 0.98 |
| $L_1$ | Bi—Ge—O | 8.4 | 8.9 | 0.94 | 0.98 |
| $L_0$ | Si/Cu | 8.8 | 9.8 | 0.90 | 0.95 |

As a comparative example, Table 2 shows Pwa, Pwb, Tb/Ta, and Tb'/Ta' for each recording layer in an optical recording medium 100 having two recording layers, as shown in FIG. 7. As in the case of the $L_4$ layer of Table 1, an $L_0$ layer is located at the position nearest to the incident surface of the laser light and the laser light which has passed through the other layer is not applied thereto, so that Pwa is equal to Pwb and hence Tb/Ta and Tb'/Ta' are "1.00."

TABLE 2

| Recording layer | Recording material | Pwa (mW) | Pwb (mW) | Tb/Ta | Tb'/Ta' |
|---|---|---|---|---|---|
| $L_1$ | Bi—Ge—O | 9 | 9 | 1.00 | 1.00 |
| $L_0$ | Bi—Ge—O | 9.4 | 9.5 | 0.99 | 0.99 |

The optical recording medium 100 is provided with two recording layers, being an $L_0$ layer 102 and an $L_1$ layer 104.

The other structures of the multilayer optical recording medium shown in FIG. 7 are denoted with the same reference numbers as detailed in the first exemplary embodiment (to be described later) and a description thereof has been omitted here.

In the $L_0$ layer 102, Bi—Ge—O (22:10:68 mol %) was used as the recording film material. Dielectric layers, each being made of $TiO_2$ with a thickness of 15 nm, were provided on either side of the Bi—Ge—O layer, and the Bi—Ge—O layer had a thickness of 40 nm. In the $L_1$ layer 104, Bi—Ge—O (22:11:67 mol %) was used as the recording film material. Dielectric layers, each being made of $TiO_2$ with a thickness of 15 nm, were provided on either side of the Bi—Ge—O layer, and the Bi—Ge—O layer had a thickness of 43 nm. The thickness of the spacer layer was 15 μm. The $L_0$ layer 102 and the $L_1$ layer 104 have write-once read-multiple recording films.

With reference to Table 1 and Table 2, it has been found that the transmittance hardly varies in the optical recording medium 100 that includes two recording layers, but the transmittance varies significantly in the multilayer optical recording medium having five recording layers.

Pwa and Pwb were measured using an optical disc evaluator (ODU-1000). The recording strategy was optimized on a recording layer basis, and a random signal was used as the recording signal. There were three recording powers used and the laser power was 0.5 mW.

In the measurement of the optimal recording power for calculating Pwa and Pwb, the same recording strategy was used and the ratio of intermediate recording power/recording power was kept constant. The recording and reproduction at this time were performed with a linear velocity of 4.9 m/s.

It should be noted that transmittance varies in a recording mark area even in the same recording layer, but transmittance does not vary in areas other than the recording mark area. When data is recorded on the $L_0$ layer, the amount of light reaching the $L_0$ layer varies between the case where data has not been recorded at all on an area on which an attempt has been made to form recording marks and which corresponds to the $L_1$ to $L_4$ layers, and the case where data has been recorded thereon. Thus, it is impossible to adequately record data using the same conditions in both cases, however, using a recording film which allows for variation in transmittance before and after recording can allow for a deviation in recording sensitivity caused by the presence or absence of recordings.

In a general write-once read-multiple recording film, a recording power margin is approximately 25% of the optimal recording power and jitter becomes 10% or less. In a rewritable recording film, however, the recording power margin is approximately 50% of the optimal recording power and jitter becomes 10% or less. Therefore, it is possible to record data even if there is large variation in transmittance.

In general write-once read-multiple recording films, recording is an irreversible reaction, and the recording power margin is narrow because the size of a recording mark increases in proportion to the strength of the recording power of the laser light used. In a phase change recording film, however, recording marks are amorphous. Since amorphousness is formed when a molten area of material is cooled at a rate that is faster than a critical cooling rate specific to that material, it is possible to form recording marks of the same size even if the size of the molten area or the cooling rate is varied. Specifically, if the same recording strategy is used when the recording power is relatively low, virtually all the molten area becomes amorphous so that a recording mark with a predetermined length is formed. When the recording power is relatively high, the cooling rate decreases in some parts of the molten area and only a part of the molten area becomes amorphous in order to form a recording mark with a predetermined length.

As described above, in the case of phase change recording where recording marks are amorphous and space sections are crystalline, it is possible to form recording marks with the same predetermined length even if the recording power is relatively high or low, and hence the recording power margin is wide.

It can be confirmed that the recording marks are amorphous and spaces (blanks) are crystalline from the fact that, for example, an electron diffraction image of a recording mark section produced by a TEM (transmission electron microscope) forms a halo pattern and an electron diffraction image of a space section (blank section) forms a spot or a ring which is derived from its crystal structure. The above matter can be also confirmed by use of a probe scanning electron microscope which can measure surface potential and the like by the fact that the electrical potential of the mark section is high and the electrical potential of the space section (being the blank section) is low.

In the present application, amorphousness and crystallinity are determined by an electron diffraction method using a TEM.

Also in the present application, the write-once read-multiple recording film is defined as a recording film on which data cannot be rewritten using the available recording linear velocity and laser light with its associated recording power. The phase change recording film is defined as a recording film in which a space section (blank section) is crystalline and an amorphous recording mark is formed using laser light with a particular recording power.

In the present application, the term "blank" should be understood to refer to a not-recorded area. The term "space" should be understood to refer to a section between recording marks when the recording marks are formed by recording laser light.

As a result of intensive investigations, the inventors have found that in a multilayer optical recording medium with three or more recording layers in which at least the recording layer nearest to an incident surface of laser light has a write-once read-multiple recording film, when data is recorded on the recording layer located farthest away from the incident surface of the laser light by applying the laser light, even if transmittance is varied by recordings occurring on the recording layers located between the farthest recording layer and the laser light incident surface side, using a phase change recording film in at least an $L_0$ layer can allow for a variation in recording sensitivity by a variation in transmittance according to the recording power margin of the farthest recording layer.

Accordingly, various exemplary embodiments of this invention provide the followings:

(1) A multilayer optical recording medium comprising three or more recording layers of an $L_0$ layer, . . . , an $L_{n-2}$ layer, and an $L_{n-1}$ layer which includes a write-once read-multiple recording film on a side farthest away from an incident surface of laser light to a side nearest to the incident surface of laser light, wherein each recording layer is irradiated with the laser light and a recording mark is formed in order to record information, wherein at least the $L_0$ layer has a phase change recording film.

(2) The multilayer optical recording medium according to (1), wherein the $L_0$ layer is rewritable at an available recording linear velocity.

(3) The multilayer optical recording medium according to (1), wherein the $L_0$ layer is a write-once read-multiple recording layer on which information is not rewritable at an available recording linear velocity.

(4) The multilayer optical recording medium according to (1), wherein a composition of a material forming the phase change recording film of the $L_0$ layer is adjusted so that information recorded on the $L_0$ layer is not rewritable at an available recording linear velocity.

(5) The multilayer optical recording medium according to (1), wherein a structure of the $L_0$ layer is adjusted so that information recorded on the $L_0$ layer is not rewritable at an available recording linear velocity.

(6) The multilayer optical recording medium according to one of (1) to (5), wherein the $L_1$ layer to the $L_{n-2}$ layer each have a write-once read-multiple recording film.

(7) The multilayer optical recording medium according to one of (1) to (5), wherein an extinction coefficient of the recording film of the $L_{n-1}$ layer at the wavelength of the laser light is 0.5 or less.

(8) The multilayer optical recording medium according to (6), wherein an extinction coefficient of the recording film of the $L_{n-1}$ layer at the wavelength of the laser light is 0.5 or less.

(9) A method for recording information on a multilayer optical recording medium, the multilayer optical recording medium including three or more recording layers of an $L_0$ layer, . . . , an $L_{n-2}$ layer, and an $L_{n-1}$ layer which includes a write-once read-multiple recording film on a side farthest away from an incident surface of laser light to a side nearest to the incident surface of laser light, at least the $L_0$ layer having a phase change recording film, wherein each recording layer is irradiated with the laser light and a recording mark is formed in order to record information, wherein when information is recorded again on the $L_0$ layer on which a recording mark has already been formed, the $L_0$ layer is irradiated with the laser light having erasing power to erase or attenuate the recording mark and then a recording mark is newly formed.

(10) A method for recording information on a multilayer optical recording medium, the multilayer optical recording medium including three or more recording layers of an $L_0$ layer, ..., an $L_{n-2}$ layer, and an $L_{n-1}$ layer which includes a write-once read-multiple recording film on a side farthest away from an incident surface of laser light to a side nearest to the incident surface of laser light, at least the $L_0$ layer having a phase change recording film, wherein each recording layer is irradiated with the laser light and a recording mark is formed in order to record information, wherein when information is recorded again on the $L_0$ layer on which a recording mark has already been formed, the recording mark is erased concurrently with a recording mark being newly formed.

(11) A method for recording information on a multilayer optical recording medium, the multilayer optical recording medium including three or more recording layers of an $L_0$ layer, ..., an $L_{n-2}$ layer, and an $L_{n-1}$ layer which includes a write-once read-multiple recording film on a side farthest away from an incident surface of laser light to a side nearest to the incident surface of laser light, at least the $L_0$ layer having a phase change recording film, wherein each recording layer is irradiated with the laser light and a recording mark is formed in order to record information, wherein when information is recorded on the $L_0$ layer, a recording linear velocity different from that when recording on the recording layers other than the $L_0$ layer is used to form a not-rewritable recording mark on the $L_0$ layer.

(12) A method for recording information on a multilayer optical recording medium, the multilayer optical recording medium including three or more recording layers of an $L_0$ layer, ..., an $L_{n-2}$ layer, and an $L_{n-1}$ layer which includes a write-once read-multiple recording film on a side farthest away from an incident surface of laser light to a side nearest to the incident surface of laser light, at least the $L_0$ layer having a phase change recording film, wherein each recording layer is irradiated with the laser light and a recording mark is formed in order to record information, wherein when information is recorded on the $L_0$ layer, a recording linear velocity different from that when recording on the recording layers other than the $L_0$ layer is used to form a rewritable recording mark on the $L_0$ layer.

According to the present invention, use of a phase change recording film in a recording layer can result in a multilayer optical recording medium becoming rewritable. Whether a multilayer optical recording medium is rewritable or not is determined by adjusting the data transfer rate of the system for recording information on the multilayer optical recording medium (i.e., adjusting the rotational speed and recording linear velocity of the multilayer optical recording medium), and the composition of the recording film material used for the phase change recording film or the structure of the recording film.

This is determined as follows.

By irradiating a phase change recording film with laser light, a change of phase between amorphousness and crystallinity occurs. The amorphous section becomes a recording mark and the crystalline section becomes a space. If the amorphous section is held at a predetermined temperature for a predetermined time, a phase change occurs and the amorphous section becomes crystalline. Based on this principle, in order to erase information which has been recorded on the phase change recording film, the amorphous section, being the recording mark, is irradiated with laser light of a predetermined recording power (corresponding to temperature) for a predetermined time and the amorphous section is turned into a crystalline region, being a space, by the phase change. Whether information is erasable or not is determined by the erasing power of the applied laser light, the irradiation time, and the crystalline temperature and speed of phase change of the amorphous section. Of these indexes, the irradiation time is determined by the recording linear velocity which is defined as an information transfer rate for recording information, and the crystalline temperature and speed of phase change of the amorphous section is determined by the composition of the recording film material and the structure of the recording film. Since the erasing power of the laser light and the recording linear velocity are determined by the specifications of the system, whether information having been recorded on a multilayer optical recording medium with a phase change recording film is erasable or not depends on the composition of the recording file material and the structure of the recording film.

Specifically, by adopting a recording film material with a composition having a low crystallization speed or a high crystallization temperature, a structure of the recording layer which prevents a sufficient crystallization temperature or time due to a high cooling effect from being obtained, or a recording film structure in which a plurality of recording film materials are mixed and the composition of this mixed section has a low crystallization speed or a high crystallization temperature, if the recording layer is designed in such a manner that the amorphous section cannot be crystallized with the erasing power of the laser light and the recording linear velocity determined by the specifications of the system, it becomes impossible to rewrite information. If a recording layer is instead designed opposite to that detailed above, it then becomes possible to rewrite information.

Conversely, from the viewpoint of a recording method, even if a recording film material with a high crystallization speed or a recording layer which has a structure which can obtain a sufficient crystallization temperature or time is adopted, for example, further increasing the recording linear velocity can realize a write-once read-multiple recording method which is not rewritable. Even if a recording film material with a low crystallization speed or a recording layer with a structure which cannot obtain a sufficient crystallization temperature or time is adopted, lowering the recording linear velocity or newly forming a recording mark after erasing or attenuating a recording mark by the irradiation of laser light with the erasing power can make the recording layer rewritable.

According to the present invention, as described above, it is possible to make a recording layer a distance away from the incident surface of the laser light, and especially the recording layer farthest away from the incident surface of the laser light either rewritable or a write-once read-multiple type. An optical recording medium in which all recording layers are the write-once read-multiple type is suitable for saving files requiring perfect accuracy because the information stored cannot be tampered with, and this type of optical recording medium is often used for saving medical files or government agencies files or the like. Using an optical recording medium with a rewritable recording layer introduces the possibility of tampering with stored information, but changing the composition of the recording film material or the dielectric material makes it impossible to tamper with or add information. Such an optical recording medium therefore becomes applicable for saving files that require perfect accuracy, so that it is possible to extend the application of such to the above listed fields and the like.

In the present application, the phrase "recording power margin" is expressed by the following equation in which $Pw_{min}$ represents the lowest value and $Pw_{max}$ represents the highest value of the recording power of laser light with jitter of 10% or less when information is recorded on the recording layer farthest away from the incident surface of the laser light in the case where data has been recorded on all recording layers except for the recording layer farthest away from the incident surface of the laser light or in the case where data has not been recorded on any of the recording layers.

$$(Pw_{max}-Pw_{min})/(Pw_{max}+Pw_{min}) \times 2 \times 100\ (\%)$$

Therefore, the greater the difference between the highest value and the lowest value of the recording power of the laser light with jitter of 10% or less, the greater the recording power margin becomes.

The allowable recording power margin is defined as 22% or more within the confines of jitter of 10% or less irrespective of whether transmittance varies or not.

According to the present invention, it is possible to provide a multilayer optical recording medium having three or more recording layers and a method for recording data on the multilayer optical recording medium where fine recording marks can be formed on a recording layer farthest away from the incident surface of laser light.

DETAILED DESCRIPTION OF THE PREFERRED EMBODIMENTS

A multilayer optical recording medium according to the best mode of the present invention has three or more recording layers such as an $L_0$ layer, an $L_1$ layer, ..., and an $L_{n-1}$ layer which includes a write-once read-multiple recording film on the side farthest away from the laser light incident surface side to the side nearest to the laser light incident surface side. Each recording layer is irradiated with the laser light and recording marks are formed in order to record information. The $L_0$ layer at least has a phase change recording film in which amorphous recording marks and crystalline spaces are formed by irradiation of the laser light.

First Exemplary Embodiment

Figure 1:
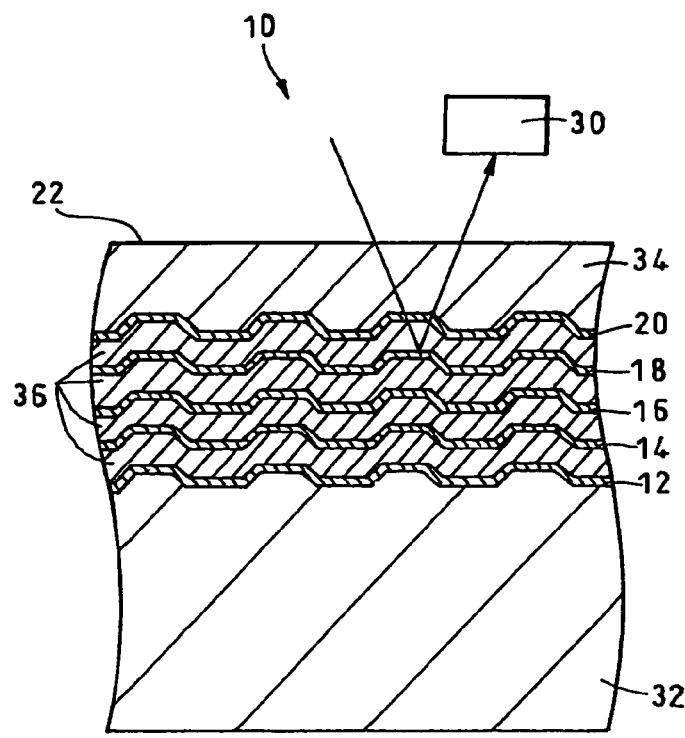
FIG. 1 is a cross-sectional side view schematically showing the whole structure of a multilayer optical recording medium according to a first exemplary embodiment of the present invention.

A multilayer optical recording medium 10 according to the first exemplary embodiment of the present invention will now be described in detail with reference to FIG. 1. In the recording layers of the multilayer optical recording medium according to the various exemplary embodiments of the present application, all deposition of materials is carried out using sputtering.

The multilayer optical recording medium 10 is in the shape of a disc with an outside diameter of 120 mm and a thickness of approximately 1.2 mm. The multilayer optical recording medium 10 comprises a substrate 32, a first recording layer (an $L_0$ layer) 12 disposed on the substrate 32 on the side (the upper side in FIG. 1) of an incident surface 22 of laser light (indicated with an arrow in FIG. 1), a second recording layer (an $L_1$ layer) 14 disposed nearer to the incident surface 22 of the laser light than the $L_0$ layer 12, a third recording layer (an $L_2$ layer) 16 disposed closer to the incident surface 22 of the laser light than the $L_1$ layer 14, a fourth recording layer (an $L_3$ layer) 18 disposed closer again to the incident surface 22 of the laser light than the $L_2$ layer 16, and a fifth recording layer (an $L_4$ layer) 20 disposed yet closer again to the incident surface 22 of the laser light than the $L_3$ layer 18. Spacer layers 36 are provided between the $L_0$ layer 12 and the $L_1$ layer 14, between the $L_1$ layer 14 and the $L_2$ layer 16, between the $L_2$ layer 16 and the $L_3$ layer 18, and between the $L_3$ layer 18 and the $L_4$ layer 20. A light transmission layer 34 is provided on the $L_4$ layer 20 on the side closest to the incident surface 22 of the laser light.

The substrate 32 has a thickness of approximately 1.1 mm. A concavo-convex pattern for composing grooves is formed in the surface of the substrate 32 and on the side of the light transmission layer 34. The term "groove" generally refers to a concave portion used for the recording and reproducing of data. In the present application, however, the term "groove" is used even if the section used for the recording or reproducing of data is a convex portion that protrudes toward the side of the light transmission layer 34. In the first exemplary embodiment, the convex section protruding toward the side of the light transmission layer 34 corresponds to a groove. The substrate 32 may be made of, for example, a polycarbonate resin, an acrylic resin, an epoxy resin, a polystyrene resin, a polypropylene resin, a silicon resin, a fluorocarbon resin, an ABS resin, an urethane resin, glass, and the like, or various kinds of metal in the instance where light does not need to pass through the substrate.

The light transmission layer 34 has a thickness in the range of, for example, 30 to 150 μm. The light transmission layer 34 may be made of, for example, a transparent energy beam-curable resin such as an acrylic UV-curable resin or an epoxy UV-curable resin. The term "energy beam" is used to collectively refer to an electromagnetic wave such as, for example, ultraviolet rays, electron beams or corpuscular rays that have the characteristic of curing a specific liquid resin. The light transmission layer 34 may be formed in such a manner that either the liquid resin is applied to the substrate and is then cured by an energy beam, or a previously manufactured transparent film may be adhered onto the substrate.

The spacer layer 36 has a thickness in the range of, for example, approximately 5 to 90 μm. Both surfaces of the spacer layer 36 have a concavo-convex pattern with grooves which correspond to those of the substrate 32. The spacer layer 36 is made of, for example, a transparent energy beam-curable resin such as an acrylic UV-curable resin or an epoxy UV-curable resin, as for the light transmission layer 34.

The $L_0$ layer 12 is formed into a concavo-convex pattern that corresponds to the concavo-convex pattern of the substrate 32. The $L_1$ layer 14, the $L_2$ layer 16, the $L_3$ layer 18, and the $L_4$ layer 20 are formed into a concavo-convex pattern also corresponding to the concavo-convex pattern of the spacer layer 36.

The structure of each recording layer will now be described.

In the $L_0$ layer 12, SbTeGe (75:20:5 mol %) was used as the recording film material. Dielectric layers made of a mixture of ZnS and $SiO_2$ were provided on both sides of the SbTeGe layer, where the SbTeGe layer had a thickness of 12 nm. The dielectric layer on the light transmission layer 34 side of the $L_0$ layer 12 is composed of a $ZnS:SiO_2$ (80:20 mol %) film having a thickness of 35 nm, and the dielectric layer on the substrate 32 side of the $L_0$ layer 12 is composed of a $ZnS:SiO_2$ (50:50 mol %) film having a thickness of 13 nm. A reflective layer made of an alloy of Ag, Pd, and Cu (98:1:1 mol %) having a thickness of 100 nm was provided between the dielectric layer located on the substrate 32 side of the $L_0$ layer 12 and the substrate 32 itself.

In the $L_1$ layer 14, the $L_2$ layer 16, the $L_3$ layer 18, and the $L_4$ layer 20, Bi—Ge—O was used as the recording film material. Dielectric layers made of $TiO_2$ were provided on both sides of the Bi—Ge—O layer of each recording layer.

Table 3 shows the thicknesses of the $TiO_2$/Bi—Ge—O/$TiO_2$ layers in the $L_1$ layer 14 to the $L_4$ layers 20 and the composition of Bi—Ge—O (recording film).

TABLE 3

| | Thickness (nm) | Composition (mol %) | | |
|---|---|---|---|---|
| | | Bi | Ge | O |
| $L_4$ | $TiO_2$ 15 | 20 | 13 | 67 |
| | Bi—Ge—O 43 | | | |
| | $TiO_2$ 15 | | | |
| $L_3$ | $TiO_2$ 15 | 22 | 11 | 67 |
| | Bi—Ge—O 40 | | | |
| | $TiO_2$ 15 | | | |
| $L_2$ | $TiO_2$ 14 | 22 | 10 | 68 |
| | Bi—Ge—O 38 | | | |
| | $TiO_2$ 14 | | | |
| $L_1$ | $TiO_2$ 10 | 28 | 2 | 70 |
| | Bi—Ge—O 34 | | | |
| | $TiO_2$ 10 | | | |

The thicknesses of the spacer layers 36 were 15 μm, 21 μm, 13 μm, and 15 μm on the substrate 32 side of each recording layer, and the thickness of the light transmission layer 34 was 40 μm. The $L_0$ layer 12 has a phase change recording film and the $L_1$ to $L_4$ layers 14 to 20 have a write-once read-multiple recording film.

In the present embodiment, the recording power $Pwa_0$ of the laser light used when data was recorded once on the $L_0$ layer 12 where data had been recorded on all recording layers from the $L_4$ layer 20 to the $L_1$ layer 14 in the multilayer optical recording medium 10, the recording power $Pwb_0$ of the laser light when data was recorded once on the $L_0$ layer 12 where data had not been recorded on any of the recording layer from the $L_4$ layer 20 to the $L_1$ layer 14, and jitter were evaluated. The wavelength λ of the recording laser light was 405 nm. The NA (numerical aperture) of the objective lens was 0.85, and the recording was performed with a linear velocity of 4.9 m/s.

Figure 4:
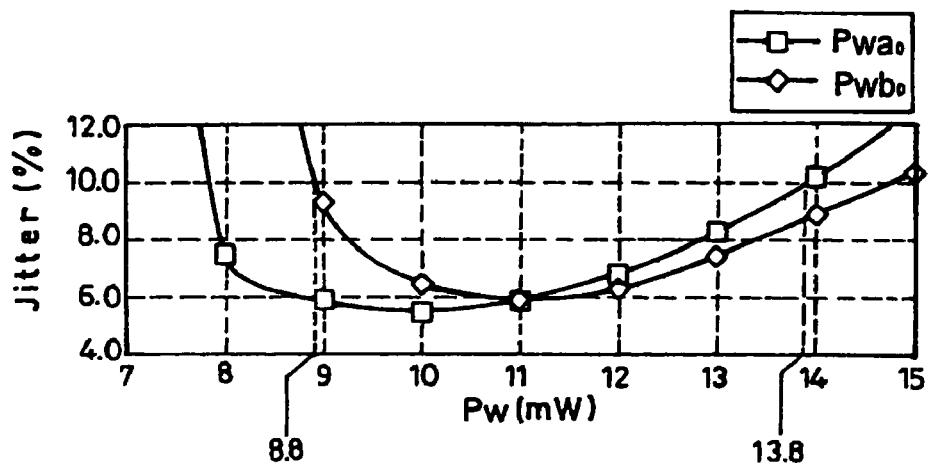
FIG. 4 is a graph showing the relationship between the recording power of laser light and jitter when data is recorded on an $L_0$ layer of the multilayer optical recording medium according to the first exemplary embodiment of the present invention.

Table 4 and FIG. 4 show results.

TABLE 4

| $Pwa_0$ | Jitter | $Pwb_0$ | Jitter |
|---|---|---|---|
| 7.5 | 20.0 | 8.5 | 18.5 |
| 8 | 7.5 | 9 | 9.3 |
| 9 | 5.9 | 10 | 6.5 |
| 10 | 5.5 | 11 | 6.0 |
| 11 | 5.9 | 12 | 6.3 |
| 12 | 6.8 | 13 | 7.5 |
| 13 | 8.3 | 14 | 8.9 |
| 14 | 10.2 | 15 | 10.4 |
| 15 | 12.5 | 16 | 11.5 |

As shown in Table 4 and FIG. 4, when the recording power of the laser light is in the range of 8.8 mW to 13.8 mW, jitter becomes 10% or less, which is a desired value irrespective of the recording conditions of the $L_4$ layer 20 to the $L_1$ layer 14. The recording power margin of the $L_0$ layer 12 of the present embodiment was 44% of the optimal recording power.

The $L_4$ layer 20 was deposited on a substrate without a groove using ETA-RA (made by STEAG ETA-Optik GmbH Co.) and had an extinction coefficient of 0.08 with a laser light having a wavelength of 405 nm.

Second Exemplary Embodiment

In the present exemplary embodiment, a multilayer optical recording medium being identical to that of the first exemplary embodiment was used. The recording power $Pwa_0$ of the laser light used when data was recorded ten times on an $L_0$ layer where data had been recorded on all recording layers of an $L_4$ layer to an $L_1$ layer in the multilayer optical recording medium, the recording power $Pwb_0$ of the laser light when data was recorded ten times on the $L_0$ layer where data had not been recorded on any recording layer of the $L_4$ layer to the $L_1$ layer, and jitter were evaluated as in the case of the first embodiment. The recording linear velocity was 4.9 m/s. When rewriting a recording mark, a new recording mark was formed concurrently with the erasing of an old recording mark.

Figure 5:
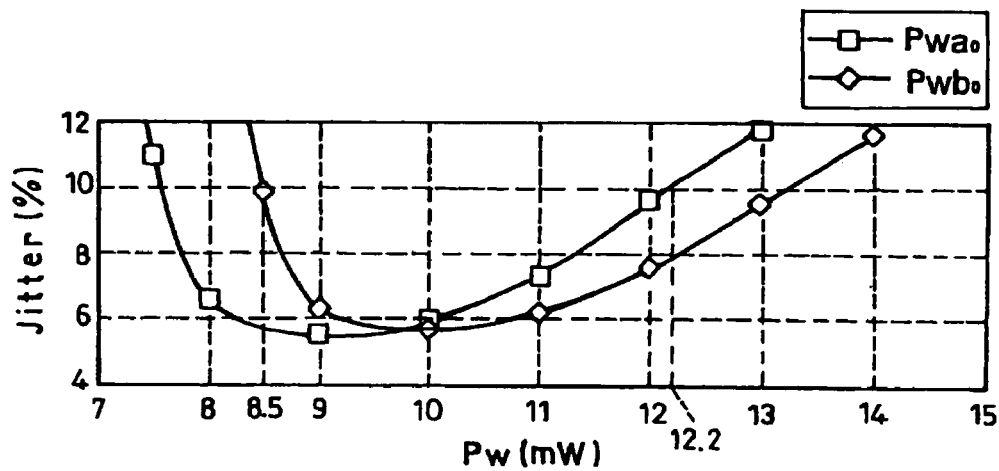
FIG. 5 is a graph showing the relationship between the recording power of laser light and jitter when data is recorded on an $L_0$ layer of the multilayer optical recording medium according to a second exemplary embodiment of the present invention.

Table 5 and FIG. 5 show the results.

TABLE 5

| $Pwa_0$ | Jitter | $Pwb_0$ | Jitter |
|---|---|---|---|
| 7 | 20.0 | 8 | 19.0 |
| 7.5 | 11.0 | 8.5 | 9.8 |
| 8 | 6.6 | 9 | 6.3 |
| 9 | 5.5 | 10 | 5.7 |
| 10 | 5.9 | 11 | 6.2 |
| 11 | 7.3 | 12 | 7.5 |
| 12 | 9.6 | 13 | 9.5 |
| 13 | 11.8 | 14 | 11.6 |

As shown in Table 5 and FIG. 5, when the recording power of the laser light is in the range of 8.5 mW to 12.2 mW, jitter becomes 10% or less, which is a desired value irrespective of the recording conditions of the $L_4$ to $L_1$ layers. The recording power margin of the $L_0$ layer of the present exemplary embodiment was 36% of the optimal recording power.

According to the present exemplary embodiment, if information was rewritten, it was then clear that the recording power margin was large enough even.

Third Exemplary Embodiment

In the present exemplary embodiment, a multilayer optical recording medium being identical to that of the first exemplary embodiment was used. The recording power $Pwa_0$ of the laser light used when data was recorded a thousand times on an $L_0$ layer where data had been recorded on all recording layers from an $L_4$ layer to an $L_1$ layer in the multilayer optical recording medium, the recording power $Pwb_0$ of the laser light when data was recorded a thousand times on the $L_0$ layer where data had not been recorded on any recording layer from the $L_4$ layer to the $L_1$ layer, and jitter were evaluated as in the case of the first exemplary embodiment. The recording linear velocity was 4.9 m/s. When rewriting a recording mark, a new recording mark was formed concurrently with the erasing of an old recording mark.

When the recording power of the laser light is in the range of 8.5 mW to 12.0 mW, jitter becomes 10% or less, which is a desired value irrespective of the recording conditions of the $L_4$ to $L_1$ layers. The recording power margin of the $L_0$ layer of this embodiment was 34% of the optimal recording power.

According to the present exemplary embodiment, if information was rewritten, it was then clear that the recording power margin was large enough.

Fourth Exemplary Embodiment

In the present exemplary embodiment, a multilayer optical recording medium being identical to that of the first exemplary embodiment was used. The recording power $Pwa_0$ of the laser light when data was recorded once on an $L_0$ layer where data had been recorded on all recording layers of an $L_4$ layer to an $L_1$ layer in the multilayer optical recording medium, the recording power $Pwb_0$ of the laser light when data was recorded once on the $L_0$ layer where data had not been recorded on any recording layer of the $L_4$ layer to the $L_1$ layer, and jitter were evaluated as in the case of the first exemplary embodiment. The recording linear velocity was 14.7 m/s.

When the recording power of the laser light is in the range of 12.3 mW to 19.0 mW, jitter becomes 10% or less, which is a desired value irrespective of the recording conditions of the $L_4$ to $L_1$ layers. The recording power margin of the $L_0$ layer of the present exemplary embodiment was 43% of the optimal recording power.

When overwriting recorded data with a signal used for rewriting, jitter could not be measured. An 8T signal with a single frequency was recorded on this medium with a recording linear velocity of 14.7 m/s and a DC laser light of 8.4 mW was then applied to measure the rate of erasure, being the rate of crystallization. The rate of erasure was lower than 25 dB required in order to allow the medium to then be rewritable, and it was established that rewriting was impossible because erasure (crystallization) was insufficient when this composition was used with this recording linear velocity.

Fifth Exemplary Embodiment

Figure 2:
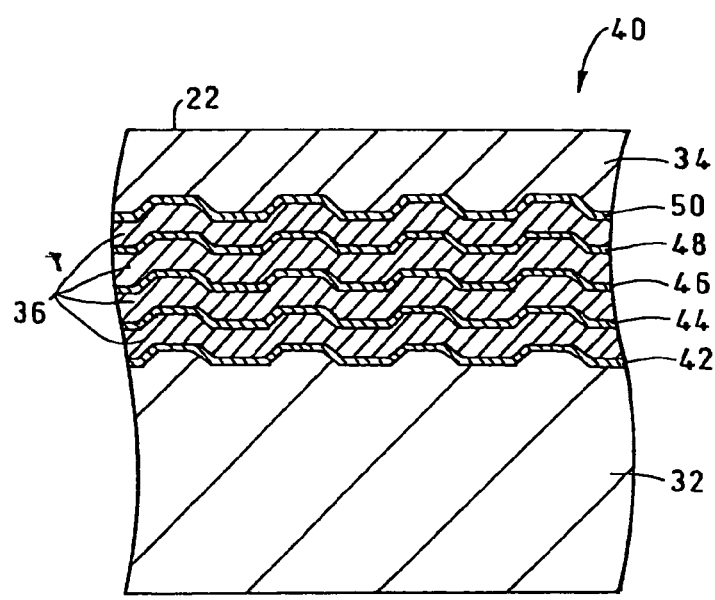
FIG. 2 is a cross-sectional side view schematically showing the whole structure of a multilayer optical recording medium according to a fifth exemplary embodiment of the present invention.

A multilayer optical recording medium 40 according to a fifth exemplary embodiment will be now described in detail with reference to FIG. 2.

As with the multilayer optical recording medium 10 according to the first exemplary embodiment, the multilayer optical recording medium 40 is provided with five recording layers, that is, an $L_0$ layer 42, an $L_1$ layer 44, an $L_2$ layer 46, an $L_3$ layer 48, and an $L_4$ layer 50. The same reference numbers as used in the first exemplary embodiment are used for the other structures of the multilayer optical recording medium, and an explanation thereof will be omitted here.

The $L_0$ layer 42, the $L_1$ layer 44, the $L_2$ layer 46, the $L_3$ layer 48, and the $L_4$ layer 50 are arranged in this order in a direction from a substrate 32 to an incident surface 22 of laser light. Spacer layers 36 are provided between the $L_0$ layer 42 and the $L_1$ layer 44, between the $L_1$ layer 44 and the $L_2$ layer 46, between the $L_2$ layer 46 and the $L_3$ layer 48, and between the $L_3$ layer 48 and the $L_4$ layer 50. A light transmission layer 34 is provided on the $L_4$ layer 50 on the side closest to the incident surface 22 of the laser light.

The multilayer optical recording medium 40 is different from the multilayer optical recording medium 10 according to the first embodiment only in the structure of the $L_0$ layer, and the structure of the $L_1$ to $L_4$ layers are the same.

In the $L_0$ layer 42, SbTeGe (70:20:10 mol %) was used as the recording film material. Dielectric layers, each being made of a mixture of ZnS and $SiO_2$, were provided on either side of the SbTeGe layer, and the SbTeGe layer had a thickness of 12 nm. The $L_0$ layer 42 has a phase change recording film and the $L_1$ layer 44 to the $L_4$ layer 50 have a write-once read-multiple recording film.

The dielectric layer on the light transmission layer 34 side is composed of a $ZnS:SiO_2$ (80:20 mol %) film having a thickness of 35 nm, and the dielectric layer on the substrate 32 side is composed of a $ZnS:SiO_2$ (50:50 mol %) film having a thickness of 13 nm. A reflective layer made of an alloy of Ag, Pd, and Cu (98:1:1 mol %) having a thickness of 100 nm was provided between the dielectric layer located on the substrate 32 side and the substrate 32 itself.

The recording power $Pwa_0$ of the laser light when data was recorded once on the $L_0$ layer 42 where data had been recorded on all recording layers of the $L_4$ layer 50 to the $L_1$ layer 44 in the multilayer optical recording medium 40, the recording power $Pwb_0$ of the laser light when data was recorded once on the $L_0$ layer 42 where data had not been recorded on any recording layer of the $L_4$ layer 50 to the $L_1$ layer 44, and jitter were evaluated. The recording linear velocity at this time was 4.9 m/s.

When the recording power of the laser light is in the range of 8.5 mW to 14.0 mW, jitter becomes 10% or less, which is a desired value irrespective of the recording conditions of the $L_4$ layer 50 to the $L_1$ layer 44. The recording power margin of the $L_0$ layer 42 of this embodiment was 49% of the optimal recording power.

When overwriting the recorded data with a signal used for rewriting, jitter could not be measured. An 8T signal with a single frequency was recorded on this medium with a recording linear velocity of 4.9 m/s and then a DC laser light of 6.4 mW was applied to measure the rate of erasure, being the rate of crystallization. The rate of erasure was lower than 25 dB required in order to allow the medium to then be rewritable, and it was established that rewriting was impossible because erasure (crystallization) was insufficient when this composition was used with this recording linear velocity.

Sixth Exemplary Embodiment

Figure 3:
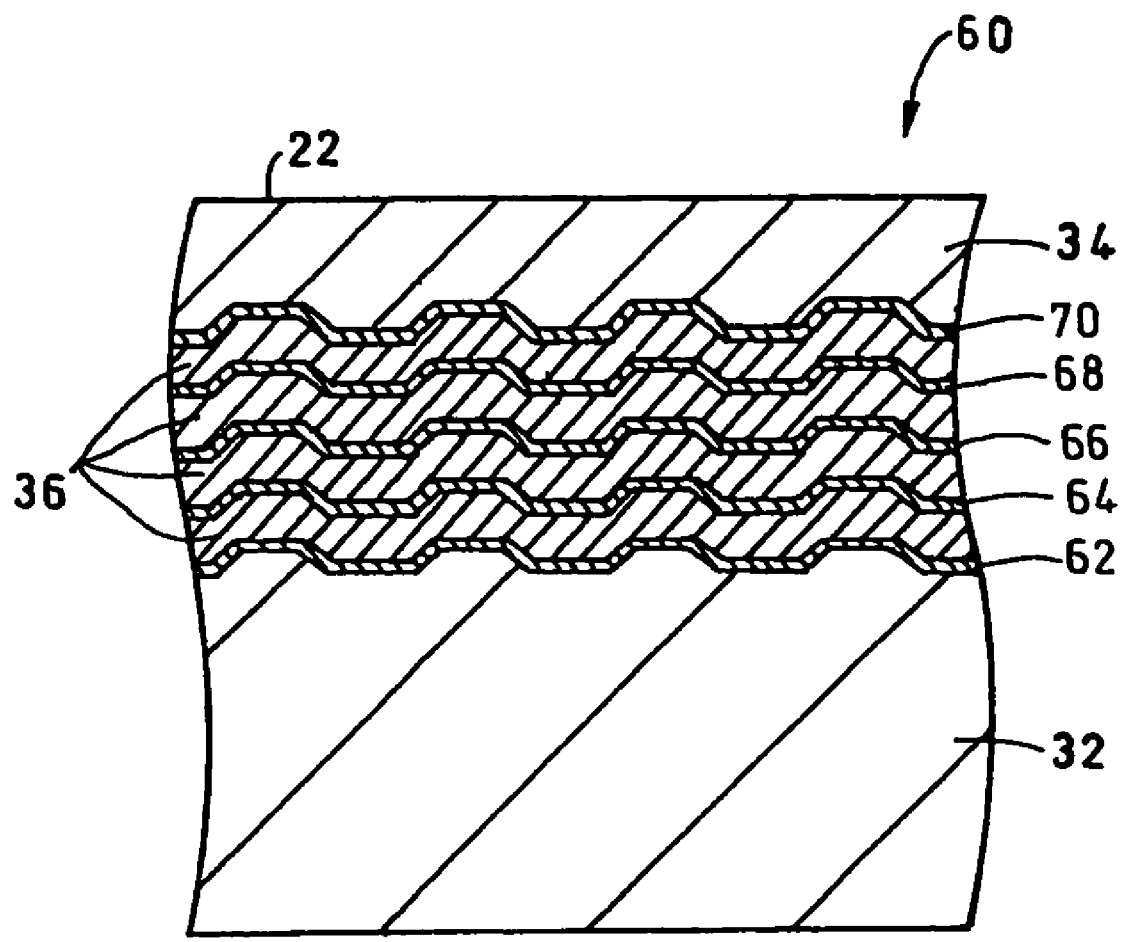
FIG. 3 is a cross-sectional side view schematically showing the whole structure of a multilayer optical recording medium according to a sixth exemplary embodiment of the present invention.

A multilayer optical recording medium 60 according to a sixth exemplary embodiment will now be described in detail with reference to FIG. 3.

As with the multilayer optical recording medium 10 according to the first exemplary embodiment, the multilayer optical recording medium 60 is provided with five recording layers, that is, an $L_0$ layer 62, an $L_1$ layer 64, an $L_2$ layer 66, an $L_3$ layer 68, and an $L_4$ layer 70. The same reference numbers as used in the first exemplary embodiment are used for the other structures of the multilayer optical recording medium, and an explanation thereof will be omitted here.

The $L_0$ layer 62, the $L_1$ layer 64, the $L_2$ layer 66, the $L_3$ layer 68, and the $L_4$ layer 70 are arranged in this order in the direction from the substrate 32 to the incident surface 22 of the laser light. Spacer layers 36 are provided between the $L_0$ layer 62 and the $L_1$ layer 64, between the $L_1$ layer 64 and the $L_2$ layer 66, between the $L_2$ layer 66 and the $L_3$ layer 68, and between the $L_3$ layer 68 and the $L_4$ layer 70. A light transmission layer 34 is provided on the $L_4$ layer 70 on the side closest to the incident surface 22 of the laser light.

The multilayer optical recording medium 60 is different from the multilayer optical recording medium 10 according to the first exemplary embodiment only in the structure of the $L_0$ layer, and the structure of the $L_1$ to $L_4$ layers are the same.

In the $L_0$ layer 62, SbTeGe (75:20:5 mol %) was used as a recording film material. The $L_0$ layer 62 has a phase change recording film and the $L_1$ layer 64 to the $L_4$ layer 70 have a write-once read-multiple recording film.

The $L_0$ layer 62 comprises a dielectric layer made of a $ZnS:SiO_2$ (80:20 mol %) film having a thickness of 35 nm, a dielectric layer made of an $Al_2O_3$ film having a thickness of 5 nm, a recording layer made of a SbTeGe layer (75:20:5 mol %) film having a thickness of 12 nm, a dielectric layer made of an $Al_2O_3$ film having a thickness of 5 nm, a dielectric layer made of a $ZnS:SiO_2$ (50:50 mol %) film having a thickness of 13 nm, and a reflective layer made of an alloy of Ag, Pd, and Cu (98:1:1 mol %) having a thickness of 100 nm arranged in this order from the light transmission layer 34 side toward the incident surface 22 of the laser light.

The recording power $Pwa_0$ of the laser light when data was recorded once on the $L_0$ layer 62 where data had been recorded on all recording layers of the $L_4$ layer 70 to the $L_1$ layer 64 in the multilayer optical recording medium 60, the recording power $Pwb_0$ of the laser light when data was recorded once on the $L_0$ layer 62 where data had not been recorded on any recording layer of the $L_4$ layer 70 to the $L_1$ layer 64, and jitter were evaluated. The recording linear velocity at this time was 4.9 m/s.

When the recording power of the laser light is in the range of 9.5 mW to 15.2 mW, jitter becomes 10% or less, which is a desired value irrespective of the recording conditions of the $L_4$ layer 70 to the $L_1$ layer 64. The recording power margin of the $L_0$ layer 62 of the present exemplary embodiment was 46% of the optimal recording power.

When overwriting the recorded data with a signal used for rewriting, jitter could not be measured. An 8T signal with a single frequency was recorded on this medium with a recording linear velocity of 4.9 m/s and a DC laser light of 6.4 mW was then applied to measure the rate of erasure, being the rate of crystallization. The rate of erasure was lower than 25 dB required in order to allow the medium to then be rewritable, and it was established that rewriting was impossible because erasure (crystallization) was insufficient when this composition was used with this recording linear velocity.

Seventh Exemplary Embodiment

In the present exemplary embodiment, a multilayer optical recording medium having exactly the same structure as that of the first exemplary embodiment was used. After data was recorded once on an $L_0$ layer of this multilayer optical recording medium with a recording linear velocity of 4.9 m/s where data had been recorded on all recording layers of $L_4$ to $L_1$ layers, the process where "recording marks are erased by DC laser light with a linear velocity of 4.9 m/s and power of 6.4 mW and new recording marks are formed" was repeated ten times with each recording power. Also, after data was recorded once on the $L_0$ layer with a recording linear velocity of 4.9 m/s where data had not been recorded on any of $L_4$ to $L_1$ layers, the process where "recording marks are erased by DC laser light with a linear velocity of 4.9 m/s and power of 6.4 mW and recording marks are newly formed" was repeated ten times with each recording power. The former recording power $Pwa_0$, the latter recording power $Pwb_0$, and jitter were then evaluated.

When the recording power of the laser light is in the range of 8.8 mW to 13.8 mW, jitter becomes 10% or less, which is a desired value irrespective of the recording conditions of the $L_4$ to $L_1$ layers. The recording power margin of the $L_0$ layer of this embodiment was 44% of the optimal recording power. The recording power margin of the present embodiment is exactly the same as that of the first embodiment.

This is because, since absorptance is different between a recording mark section and a space section, the difference in an optical recording condition narrows the recording power margin when rewriting is carried out without erasure being required first. However, if recording marks are erased by a laser light with an erasing power and then a new recording is carried out, the optical recording condition does not change, and it is possible to obtain the same recording power margin as that of the first recording undertaken without erasure being required first.

COMPARATIVE EXAMPLE 1

Figure 6:
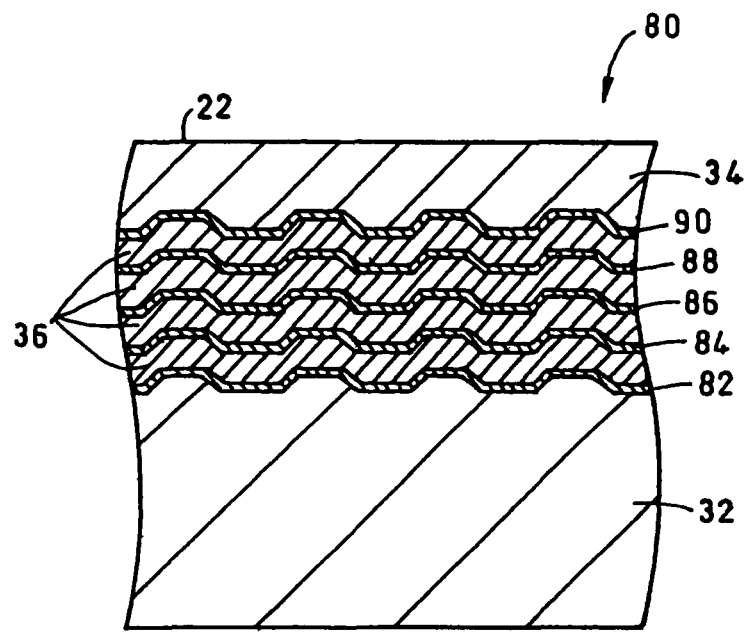
FIG. 6 is a cross-sectional side view schematically showing the whole structure of a multilayer optical recording medium according to a comparative example 1 of the present invention.
Figure 7:
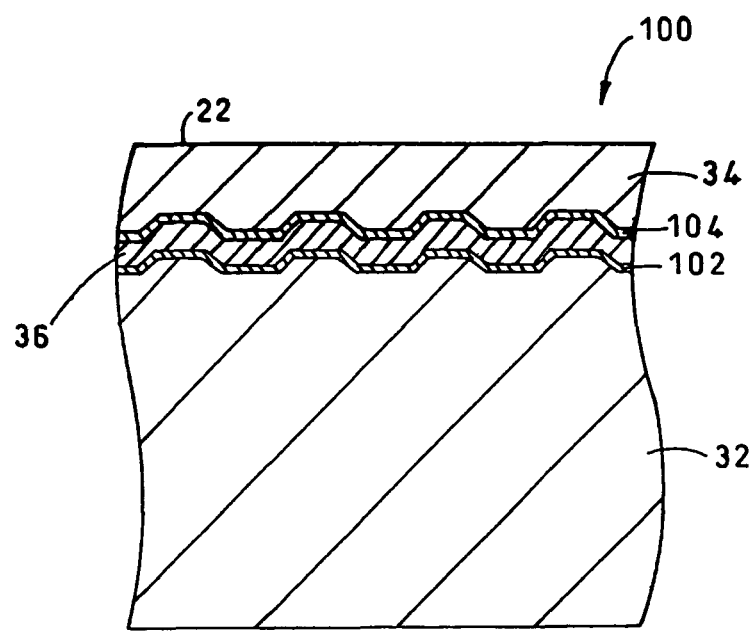
FIG. 7 is a cross-sectional side view which schematically shows the whole structure of a conventional multilayer optical recording medium having two recording layers.

A multilayer optical recording medium 80 according to Comparative Example 1 will now be described in detail with reference to FIG. 6.

The multilayer optical recording medium 80, as with the multilayer optical recording medium 10 according to the first exemplary embodiment, is provided with five recording layers, that is, an $L_0$ layer 82, an $L_1$ layer 84, an $L_2$ layer 86, an $L_3$ layer 88, and an $L_4$ layer 90. The same reference numbers as used in the first exemplary embodiment are used for the other structures of the multilayer optical recording medium, and an explanation thereof will be omitted here.

The $L_0$ layer 82, the $L_1$ layer 84, the $L_2$ layer 86, the $L_3$ layer 88, and the $L_4$ layer 90 are arranged in this order in the direction from the substrate 32 to the incident surface 22 of the laser light. Spacer layers 36 are provided between the $L_0$ layer 82 and the $L_1$ layer 84, between the $L_1$ layer 84 and the $L_2$ layer 86, between the $L_2$ layer 86 and the $L_3$ layer 88, and between the $L_3$ layer 88 and the $L_4$ layer 90. A light transmission layer 34 is provided on the $L_4$ layer 90 on the side closest to the incident surface 22 of the laser light.

The multilayer optical recording medium 80 is different from the multilayer optical recording medium 10 according to the first exemplary embodiment only in the structure of the $L_0$ layer, and the structure of the $L_1$ to $L_4$ layers are the same.

In the $L_0$ layer 82, Si and Cu were used as the recording film material, and an Si layer with a thickness of 6 nm and a Cu layer with a thickness of 6 nm were both deposited on the $L_0$ layer 82. The Cu layer is disposed on the substrate 32 side of the $L_0$ layer 82 and the Si layer is disposed on the light transmission layer 34 side of the $L_0$ layer 82. The $L_0$ layer 82 has a phase change recording film and the $L_1$ layer 84 to the $L_4$ layer 90 have a write-once read-multiple recording film.

Dielectric layers, each being made of a mixture of ZnS and $SiO_2$, were provided on either side of the deposited Si layer and Cu layer. The dielectric layer on the light transmission layer 34 side is composed of a ZnS:SiO$_2$ (80:20 mol %) film having a thickness of 40 nm, and the dielectric layer on the substrate 32 side is composed of a ZnS:SiO$_2$ (80:20 mol %) film having a thickness of 40 nm. A reflective layer made of an alloy of Ag, Pd, and Cu (98:1:1 mol %) having a thickness of 100 nm was provided between the dielectric layer located on the substrate 32 side and the substrate 32 itself.

In the multilayer optical recording medium 80, the recording power Pwa$_0$ of the laser light when data was recorded once on the L$_0$ layer 82 where data had been recorded on all recording layers of the L$_4$ layer 90 to the L$_1$ layer 84 in the multilayer optical recording medium 80, the recording power Pwb$_0$ of the laser light when data was recorded once on the L$_0$ layer 82 where data had not been recorded on any of the L$_4$ layer 90 to the L$_1$ layer 84, and jitter were evaluated. The recording linear velocity-at this time was 4.9 m/s.

Figure 8:
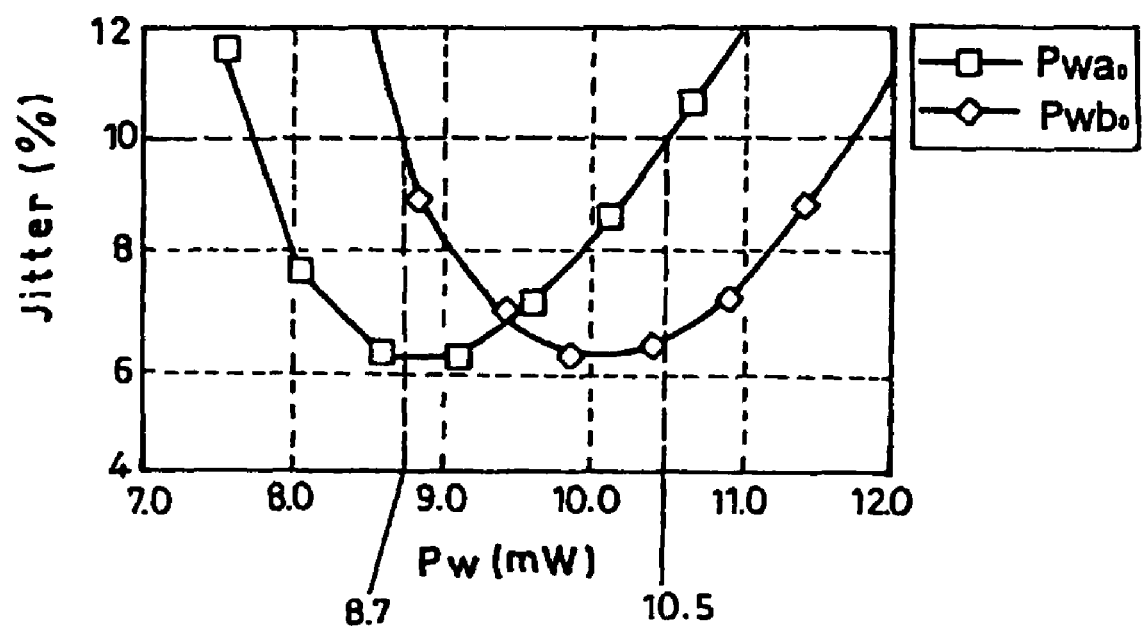
FIG. 8 is a graph showing the relationship between the recording power of laser light and jitter when data is recorded on an $L_0$ layer of the multilayer optical recording medium according to the comparative example 1 of the present invention.

Table 6 and FIG. 8 show results.

TABLE 6

| Pwa$_0$ | Jitter | Pwb$_0$ | Jitter |
|---|---|---|---|
| 7.6 | 11.8 | 8.2 | 13.0 |
| 8.2 | 7.8 | 8.8 | 8.9 |
| 8.7 | 6.2 | 9.4 | 7.0 |
| 9.2 | 6.1 | 9.8 | 6.1 |
| 9.7 | 7.2 | 10.4 | 6.2 |
| 10.2 | 8.5 | 10.9 | 7.0 |
| 10.7 | 10.7 | 11.4 | 8.9 |
| 11.2 | 13.0 | 12.2 | 12.2 |

As shown in Table 6 and FIG. 8, when the recording power of the laser light is in the range of 8.7 mW to 10.5 mW, jitter becomes 10% or less, which is a desired value irrespective of the recording conditions of the L$_4$ layer 90 to the L$_1$ layer 84. The recording power margin of the L$_0$ layer 82 of this comparative example was 19% of the optimal recording power.

The extinction coefficient of the recording film of the L$_4$ layer 90 with the laser light used was measured in the same way as the first exemplary embodiment, and a result of 0.08 was obtained.

The results showed that the recording power margin according to this comparative example was smaller than those of the various exemplary embodiments.

The inventors have discovered that, as described in the first to sixth exemplary embodiments, use of the phase change recording film in at least the L$_0$ layer makes it possible for the recording power margin of the L$_0$ layer to easily become at least 25% greater than the optical recording power.

In this case, if the extinction coefficient of the L$_4$ layer in the first to sixth exemplary embodiments is 0.5 or less, the high transmission reduces the reduction in reflectivity even in a state after deposition. Thus, it turns out that the deposition of many layers becomes easy as the desired reflectivity of each layer is reduced.

Furthermore, in this case, it was found that data was also easily recorded again on the L$_0$ layer in which recording marks had been formed, as detailed in the first and second exemplary embodiments, if the recording marks were newly formed after the erasure of the original recording marks.

As in the case of the seventh exemplary embodiment, it was found that the recording power margin of the L$_0$ layer in which recording marks had been formed easily became at least 25% greater than the optimal recording power, if, when data was recorded again on the L$_0$ layer, the recording marks were newly formed after the recording marks originally formed in the L$_0$ layer were erased or attenuated.

In the first to seventh exemplary embodiments, the multilayer optical recording mediums 10, 40, and 60 are a one-sided recording disc which is provided with recording layers on one side only. The present invention, however, is applicable to a double-sided multilayer optical recording medium which is provided with recording layers on both sides.

In the first to seventh exemplary embodiments, the L$_0$ layer has a phase change recording film, and the L$_1$ to L$_4$ layers have a write-once read-multiple recording film. The L$_1$ to L$_3$ layers may have a phase change recording film, a write-once read-multiple recording film, or any recording film other than those already discussed herein.

In the first to seventh exemplary embodiments, the multilayer optical recording mediums 10, 40, and 60 are a multilayer optical recording medium having five recording layers. The present invention, however, has the same effect on a multilayer optical recording medium having three or on four recording layers or on a multilayer optical recording medium having six or more recording layers.

According to the first to seventh exemplary embodiments, in the multilayer optical recording mediums 10, 40, and 60, the light transmission layer 34 is thinner than the substrate 32. The present invention, however, is also applicable to an optical recording medium in which a substrate and a light transmission layer have the same thickness, like that of DVDs.

Furthermore, according to the first to seventh exemplary embodiments, the multilayer optical recording mediums 10, 40, and 60 were evaluated using a Blu-ray (trademark) disc system with NA=0.85 and a wavelength of 405 nm. The present invention, however, is applicable to an NA and a wavelength other than these.

What is claimed is:

1. A method for recording information on a multilayer optical recording medium, the multilayer optical recording medium including three or more recording layers of an L$_0$ layer, an L$_1$ layer, ..., and an L$_{n-1}$ layer on a side farthest away from an incident surface of laser light to a side nearest to the incident surface of laser light when n is three or more, wherein,
   wavelength λ of the laser light is 405 nm.,
   numerical aperture NA of an objective lens for the laser light is 0.85,
   the L$_{n-1}$ layer includes a write-once read-multiple recording film, the L$_0$ layer has a phase change recording film and is rewritable at an available recording linear velocity,
   each recording layer is irradiated with the laser light and a recording mark is formed in order to record information, and
   when information is recorded again on the L$_0$ layer on which a recording mark has already been formed, the L$_0$ layer is irradiated with the laser light having erasing power to erase or attenuate the recording mark and then a recording mark is newly formed.

2. A method for recording information on a multilayer optical recording medium, the multilayer optical recording medium including three or more recording layers of an L$_0$ layer, an L$_1$ layer, ..., and an L$_{n-1}$ layer on a side farthest away from an incident surface of laser light to a side nearest to the incident surface of laser light when n is three or more, wherein,
   wavelength λ of the laser light is 405 nm,
   numerical aperture NA of an objective lens for the laser light is 0.85, the $L_{n-1}$ layer includes a write-once read-multiple recording film, the $L_0$ layer has a phase change recording film and is rewritable at an available recording linear velocity, each recording layer is irradiated with the laser light and a recording mark is formed in order to record information, and when information is recorded on the $L_0$ layer, a recording linear velocity different from that when recording on the recording layers other than the $L_0$ layer is used to form a rewritable recording mark on the $L_0$ layer.

3. A multilayer optical recording medium comprising three or more recording layers of an $L_0$ layer, an $L_1$ layer, ..., and an $L_{n-1}$ layer on a side farthest away from an incident surface of laser light to a side nearest to the incident surface of laser light when n is three or more, wherein each recording layer is irradiated with the laser light and a recording mark is formed in order to record information, wherein wavelength $\lambda$ of the laser light is 405 nm, numerical aperture NA of an objective lens for the laser light is 0.85, and the $L_{n-1}$ layer includes a write-once read-multiple recording film, and the $L_0$ layer has a phase change recording film and is rewritable at an available recording linear velocity.

4. The multilayer optical recording medium according to claim 3, wherein the layers between the $L_0$ layer and the $L_{n-1}$ layer each have a write-once read-multiple recording film.

5. A method for recording information on a multilayer optical recording medium, the multilayer optical recording medium including three or more recording layers of an $L_0$ layer, an $L_1$ layer, ..., and an $L_{n-1}$ layer on a side farthest away from an incident surface of laser light to a side nearest to the incident surface of laser light when n is three or more, wherein, wavelength $\lambda$ of the laser light is 405 nm, numerical aperture NA of an objective lens for the laser light is 0.85, the $L_{n-1}$ layer includes a write-once read-multiple recording film, the $L_0$ layer is rewritable at an available recording linear velocity, and has a phase change recording film in which amorphous recording marks and crystalline spaces are formed by irradiation of the laser light, each recording layer is irradiated with the laser light and a recording mark is formed in order to record information, and when information is recorded again on the $L_0$ layer on which a recording mark has already been formed, the recording mark is erased concurrently with a recording mark being newly formed.

* * * * *